(12) United States Patent
Oh et al.

(10) Patent No.: US 7,738,835 B2
(45) Date of Patent: Jun. 15, 2010

(54) APPARATUS AND METHOD FOR FREQUENCY REUSE TO AVOID INTERFERENCE BETWEEN RELAY STATION AND MOBILE STATION IN MULTI-HOP RELAY SYSTEM

(75) Inventors: Chang-Yoon Oh, Yongin-si (KR);
Eun-Taek Lim, Suwon-si (KR);
Young-Bin Chang, Anyang-si (KR);
Cheng Shan, Suwon-si (KR);
Dong-Seek Park, Yongin-si (KR);
Pan-Yuh Joo, Seoul (KR)

(73) Assignee: Samsung Electronics Co., Ltd (KR)

( * ) Notice: Subject to any disclaimer, the term of this patent is extended or adjusted under 35 U.S.C. 154(b) by 553 days.

(21) Appl. No.: 11/804,699

(22) Filed: May 18, 2007

(65) Prior Publication Data
US 2007/0270113 A1 Nov. 22, 2007

(30) Foreign Application Priority Data
May 19, 2006 (KR) .................. 10-2006-0045178

(51) Int. Cl.
*H04B 3/36* (2006.01)

(52) U.S. Cl. ............ 455/7; 455/63.1; 455/67.13; 370/315

(58) Field of Classification Search ........... 455/7–11, 455/14–25, 63.1, 67.13; 370/315
See application file for complete search history.

(56) References Cited

U.S. PATENT DOCUMENTS

| 7,392,054 B2 | 6/2008 | Cho et al. |
| 2005/0288027 A1 | 12/2005 | Cho et al. |
| 2009/0303918 A1* | 12/2009 | Ma et al. ............... 370/315 |

FOREIGN PATENT DOCUMENTS

| KR | 1020050114589 | 12/2005 |
| KR | 1020050119055 | 12/2005 |

* cited by examiner

*Primary Examiner*—Raymond S Dean
(74) *Attorney, Agent, or Firm*—The Farrell Law Firm, LLP

(57) ABSTRACT

An apparatus and method is disclosed for frequency reuse to avoid interference between a Relay Station (RS) and a Mobile Station (MS) in a multi-hop relay system. The method includes measuring a preamble signal strength of a serving RS, measuring a preamble signal strength of a neighboring RS, and computing a preamble signal strength ratio using the preamble signal strength of the serving RS and the preamble signal strength of the neighboring RS.

20 Claims, 8 Drawing Sheets

APPARATUS AND METHOD FOR FREQUENCY REUSE TO AVOID INTERFERENCE BETWEEN RELAY STATION AND MOBILE STATION IN MULTI-HOP RELAY SYSTEM

PRIORITY

This application claims priority under 35 U.S.C. §119 to an application filed in the Korean Intellectual Property Office on May 19, 2006 and assigned Serial No. 2006-45178, the contents of which are incorporated herein by reference.

BACKGROUND OF THE INVENTION

1. Field of the Invention

The present invention relates to a multi-hop relay system, and, in particular, to an apparatus and method for frequency reuse to avoid interference between a Relay Station (RS) and a Mobile Station (MS).

2. Description of the Related Art

To realize a self-adaptive wireless network required in a next generation mobile telecommunication system, techniques applied in an ad hoc network need to be introduced to the mobile telecommunication system. A typical example of the mobile telecommunication system is a multi-hop relay based broadband wireless access communication system which is constructed with a fixed Base Station (BS) and employs a multi-hop relay scheme used in the ad hoc network.

In the broadband access communication system, communication between the BS and a Mobile Station (MS) is achieved through one direct link. Thus, a highly reliable wireless communication link can be readily constructed between the MS and the BS. However, since a position of the BS is fixed, configuration flexibility of a wireless network is low. As a result, it has been difficult to effectively provide service in a wireless communication environment where there is a rapid change in traffic distribution and call demands.

To address this shortcoming, the broadband wireless access communication system employs a relay scheme in which data is delivered in a multi-hop manner by using a plurality of surrounding MSs or fixed BSs. According to the multi-hop relay scheme, a network can be rapidly reconfigured in response to a change in the surrounding environment, and the entire wireless network can be further effectively managed. Therefore, the self-adaptive wireless network required by next generation wireless telecommunication systems can be realized by modeling after the multi-hop relay based broadband wireless access communication system.

Advantageously, the multi-hop relay scheme can cover a partial shadow area resulted from an insufficient electric field. In addition, the use of the multi-hop relay scheme can reduce an initial installation charge since a relay is established in an initial stage when a service request is not frequently made. Therefore, the multi-hop relay scheme can broaden cell service coverage and increase system capacity.

Now, referring to FIG. 1, a communication method using a Relay Station (RS) in a broadband wireless access communication system employing a conventional multi-hop relay scheme will be described.

An MS3 111 within the coverage area of a BS 101 is connected to the BS 101 through a direct link. An MS1 107 and an MS2 109 are located outside the coverage area of BS 101, and thus have a poor channel quality with respect to BS 101. Therefore, MS1 107 and MS2 109 are connected to BS 101 though a relay link by use of an RS1 103 and an RS2 105, respectively. When MSs 107 and 109 communicate with BS 101 when MSs 107 and 109 are located outside the coverage area of BS 101 or in a shadow area suffering a serious shielding phenomenon due to buildings, a better wireless channel quality of a link between MSs 107 and 109 and BS 101 can be achieved by the use of RS1 103 and RS2 105. Therefore, by using the multi-hop relay scheme, BS 101 can provide a high-speed data channel in a cell boundary region having a poor channel quality and also can extend the cell service coverage.

In the broadband wireless access communication system employing the multi-hop relay scheme, communication using RS1 103 and RS2 105 is made using a frame which has two transmission periods (hereinafter referred to as phases) in a time axis. In a first phase (i.e. PHASE-I) of the frame, a BS-RS transmission or a BS-MS transmission is achieved through a direct link. In a second phase (i.e. PHASE-II) of the frame, a frequency is reused for an RS-MS transmission for a relay communication. In the relay communication, information transmitted from the BS to the RS during the PHASE-I is retransmitted to the MS. In PHASE-II, power transmitted from a certain RS acts as a signal component (indicated by a solid line) for its corresponding MS and acts as interference (indicated by a dotted line) for a neighboring MS. For example, as shown in FIG. 2A, the frame may have two transmission periods, that is, a PHASE-I 201 and a PHASE-II 203. Alternatively, as shown in FIG. 2B, the frame may have three transmission periods, that is, a PHASE-I 205, a PHASE-II 207 and a PHASE-I 209. As such, in the multi-hop rely type wireless access communication system using RSs, it is possible to increase the capacity of a packet transmission system by reuse of wireless resources.

However, as shown in FIG. 3, if a frequency is reused in a link between an RS and an MS (e.g., a link between an RS1 301 and an MS1 305, a link between an RS2 303 and an MS2 307, etc.), the MS1 305 may receive a strong interference signal from its neighboring RS2 303 when the MS1 305 is located in a boundary coverage of the serving RS1 301. In this case, in order to increase cell capacity, a new technique may be taken into account in which the delivery of transmission power from the RS1 301 to the MS1 305 is stopped to avoid signal interference between two links RS1-MS1 and RS2-MS2. In order to accommodate the technique, a procedure for a method of frequency reuse has to be defined to avoid interference between an RS and an MS in a multi-hop relay system.

SUMMARY OF THE INVENTION

An aspect of the present invention substantially solves at least the above problems and/or disadvantages and provides at least the advantages below. Accordingly, an aspect of the present invention provides an apparatus and method for frequency reuse to avoid interference between a Relay Station (RS) and a Mobile Station (MS) in a multi-hop relay system.

Another aspect of the present invention is to provide an apparatus and method for transmitting a minimum amount of interference information to a BS by an MS, and performing a scheduling operation according to the interference information received from the MS by the BS, thereby avoiding interference of an MS-RS link in a multi-hop relay system.

According to one aspect of the present invention, there is provided a method of avoiding interference between an RS and an MS in a multi-hop relay system, the method includes measuring a preamble signal strength of a serving RS; measuring a preamble signal strength of a neighboring RS; and computing a preamble signal strength ratio using the preamble signal strength of the serving RS and the preamble signal strength of the neighboring RS.

According to another aspect of the present invention, there is provided a method of avoiding interference between an RS and an MS in a multi-hop relay system, the method including if interference information is received from one or more MSs, selecting one MS having the greatest number of minor interferences by using the received interference information for each MS; and scheduling the selected MS.

According to another aspect of the present invention, there is provided an apparatus for avoiding interference between an RS and an MS in a multi-hop relay system, the apparatus including a preamble signal strength measuring unit for measuring a preamble signal strength of a serving RS and a preamble signal strength of a neighboring RS; and a preamble signal strength ratio computation unit for computing a preamble signal strength ratio using the preamble signal strength of the serving RS and the preamble signal strength of the neighboring RS.

According to another aspect of the present invention, there is provided an apparatus for avoiding interference between an RS and an MS in a multi-hop relay system, the apparatus includes an interference information receiver for receiving interference information from one or more MSs; and a scheduler for selecting one MS having the greatest number of minor interferences using the received interference information for each MS and then scheduling the selected MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
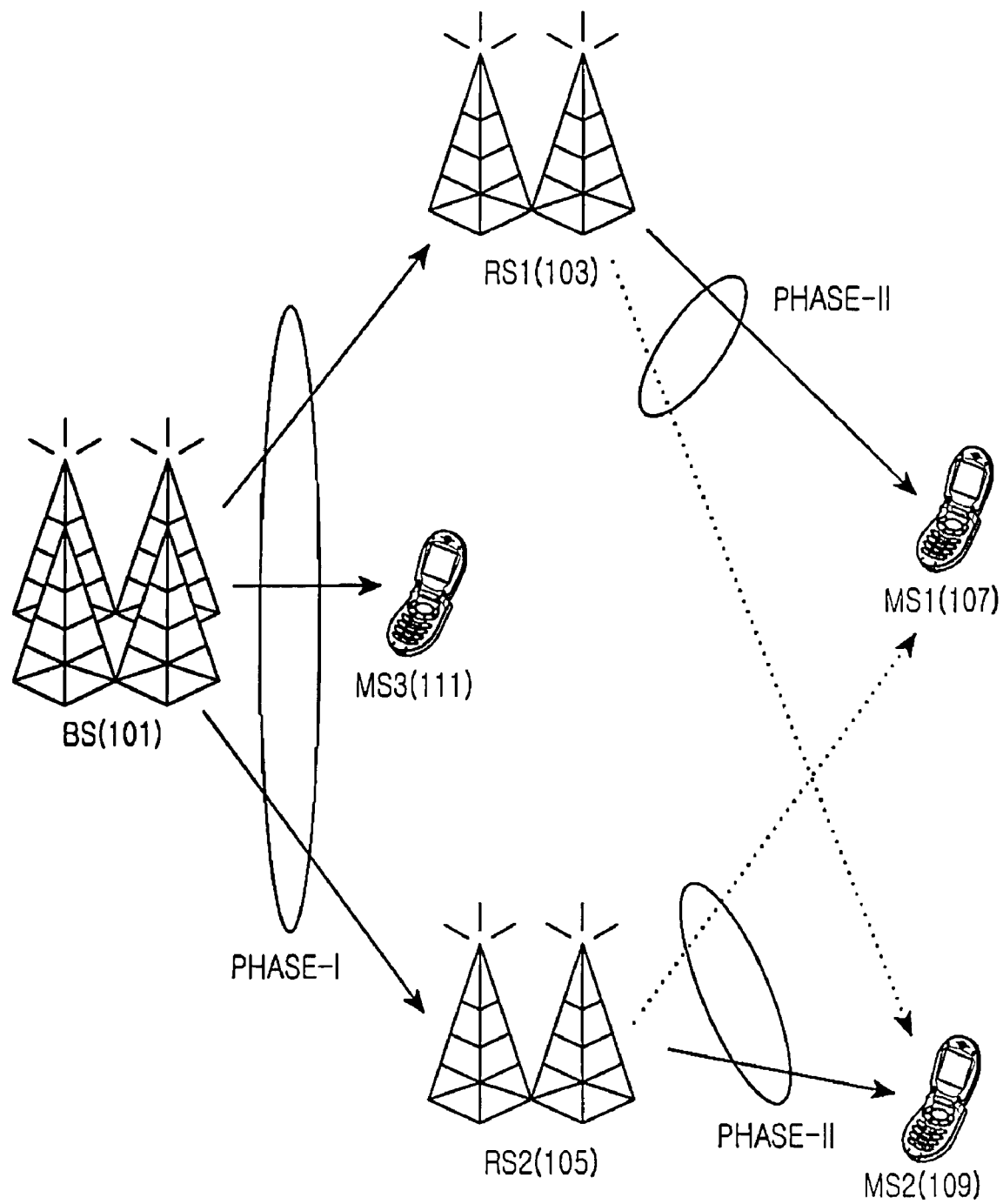
FIG. 1 provides an overview of a communication method using a Relay Station (RS) in a broadband wireless access communication system employing a conventional multi-hop relay scheme.
Figure 2A:
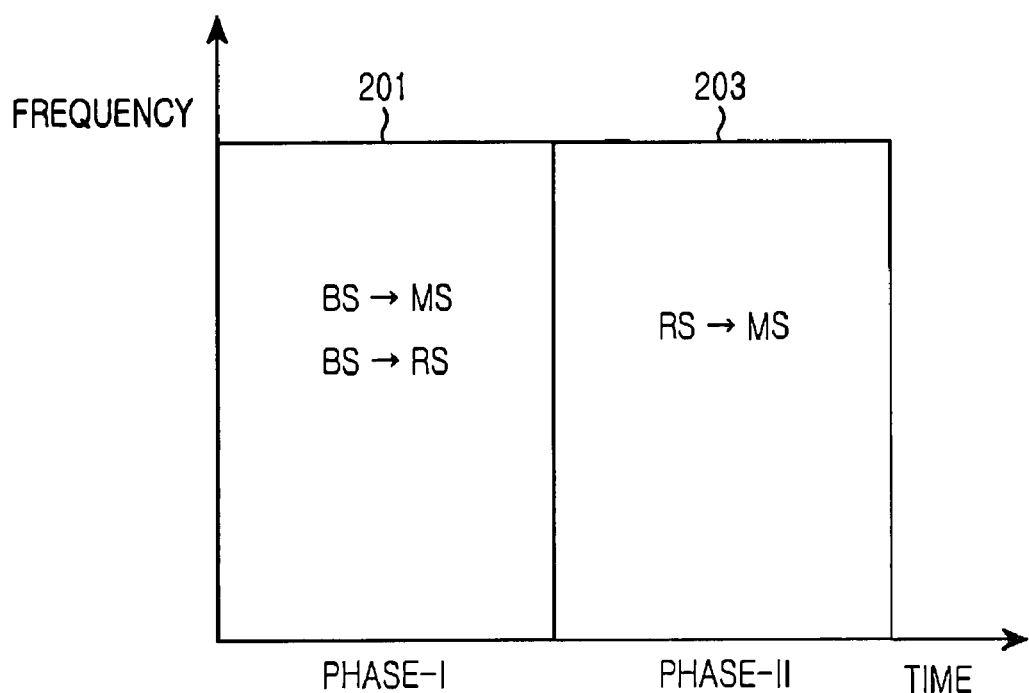
FIGS. 2A and 2B are examples of a frame having transmission periods divided in the time axis in a broadband wireless access communication system employing a conventional multi-hop relay scheme.
Figure 2B:
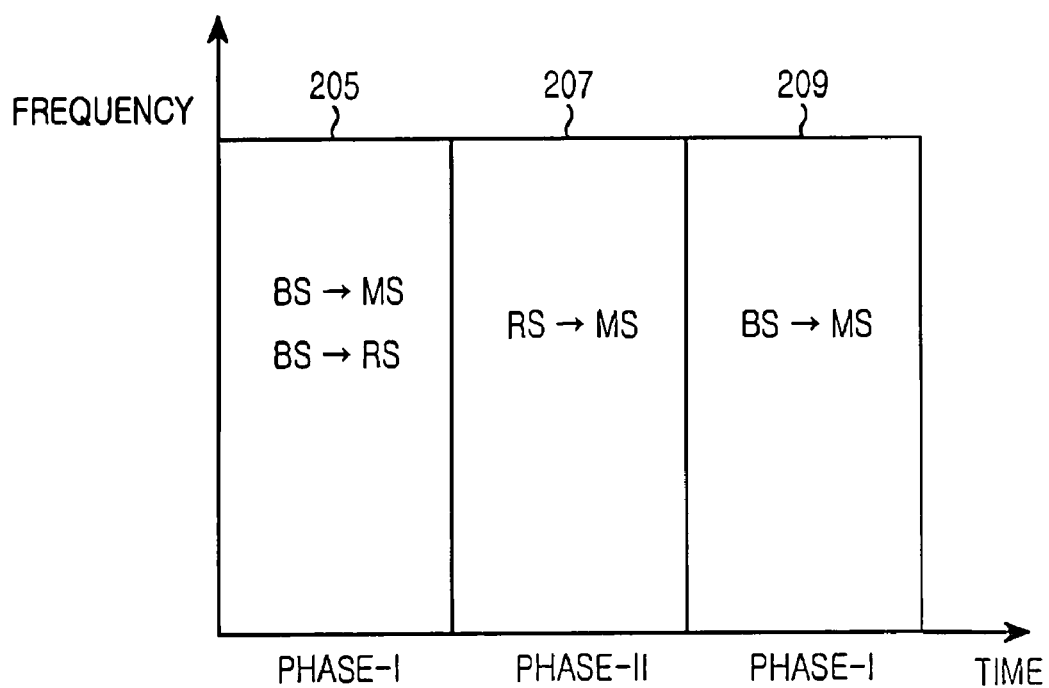
Figure 3:
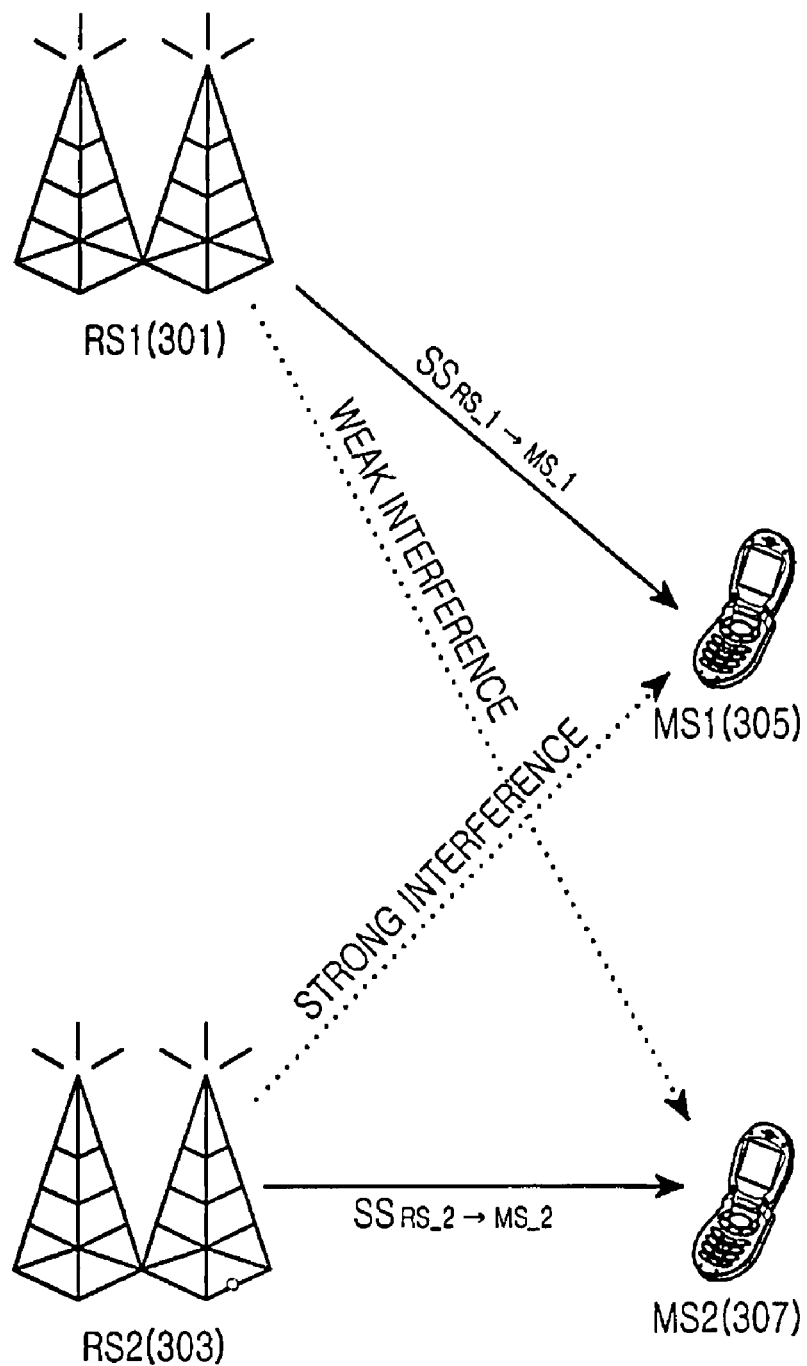
FIG. 3 provides an overview of interference between a Mobile Station (MS) and a neighboring RS in a broadband wireless access communication system employing a conventional multi-hop relay scheme.

Hereinafter, an apparatus and method for frequency reuse to avoid interference between a Relay Station (RS) and a Mobile Station (MS) in a multi-hop relay system will be described. Although a wireless communication system employing a Time Division Duplex (TDD) scheme and an Orthogonal Frequency Division Multiple Access (OFDMA) scheme will be described below as an example, the present invention is not limited thereto. Thus, the present invention may also be applied to other communication system employing a different scheme. Moreover, although a broadband wireless access communication system employs a multi-hop relay scheme and uses the 2-phase structure shown in FIG. 2 as an example in order to reuse a frequency resource. As described below, the present invention may employ other structures as well.

Figure 4:
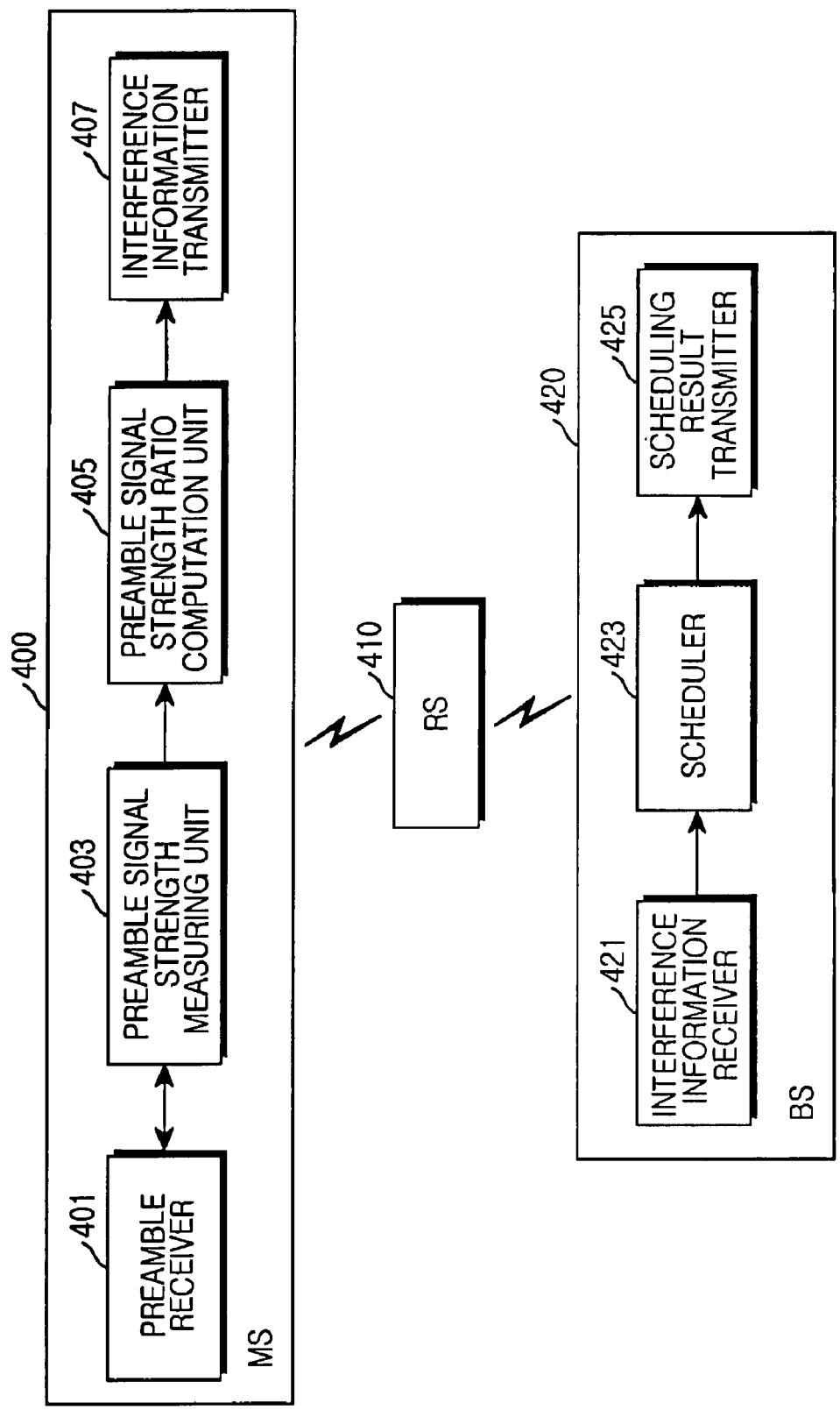
FIG. 4 is a block diagram of an apparatus for frequency reuse to avoid interference between an RS and an MS in a multi-hop relay system according to the present invention.

FIG. 4 is a block diagram of an apparatus for frequency reuse to avoid interference between an RS and an MS in a multi-hop relay system according to the present invention. The multi-hop relay system includes an MS 400, an RS 410 and a BS 420. The MS 400 includes a preamble receiver 401, a preamble signal strength measuring unit 403, a preamble signal strength ratio computation unit 405 and interference information transmitter 407. The BS 420 includes an interference information receiver 421, a scheduler 423 and a scheduling result transmitter 425.

Referring to FIG. 4, the preamble receiver 401 of the MS 400 receives a preamble from its serving RS 410 or a neighboring RS, and outputs the received preamble to the preamble signal strength measuring unit 403.

The preamble signal strength measuring unit 403 measures a signal strength of the preamble of the serving RS 410, where the preamble is received from the preamble receiver 401. Then, the preamble signal strength measuring unit 403 compares the measured signal strength of the preamble with a predetermined threshold. When the measured signal strength of the preamble is less than the predetermined threshold, the preamble signal strength measuring unit 403 measures a signal strength of a preamble of the neighboring RS, where the preamble is received from the preamble receiver 401. Then, the preamble signal strength measuring unit 403 outputs the measured signal strength of the preamble of the serving RS 410 and the measured signal strength of the preamble of the neighboring RS to the preamble signal strength ratio computation unit 405.

The preamble signal strength ratio computation unit 405 computes a preamble signal strength ratio by using the signal strength of the preamble of the serving RS 410 and the signal strength of the preamble of the neighboring RS. Then, the preamble signal strength ratio computation unit 405 outputs the computation result to the interference information transmitter 407 as interference information regarding the serving RS 410 and then transmits the output result to the BS 420.

The interference information transmitter 407 transmits the interference information input from the preamble signal strength ratio computation unit 405 to the BS 420.

The RS 410 acts as a relay, delivering a signal of the MS 400 to the BS 420 and delivering a signal of the BS 420 to the MS 400.

The interference information may be directly transmitted to the BS 420 through an uplink between the MS 400 and the BS 420 without having to use the RS 410.

The interference information receiver 421 of the BS 420 receives the interference information from the MS 400, and outputs the received interference information to the scheduler 423.

According to the interference information input from the interference information receiver 421, the scheduler 423 performs a scheduling operation to determine whether to use a link between an MS and its corresponding RS. The scheduling operation is carried out while assigning a top priority to all MS that receives minor interference to an MS that most frequently receives interference. Then, the scheduler 423 outputs the scheduling determination result to the scheduling result transmitter 425. The reason why the scheduling determination result is output to the scheduling result transmitter 425 is to determine whether a corresponding MS-RS link will be used in the process of transmitting the determination result to the corresponding RS 410.

The scheduling result transmitter 425 transmits the scheduling determination result input from the scheduler 423 to the corresponding RS 410.

Figure 5:
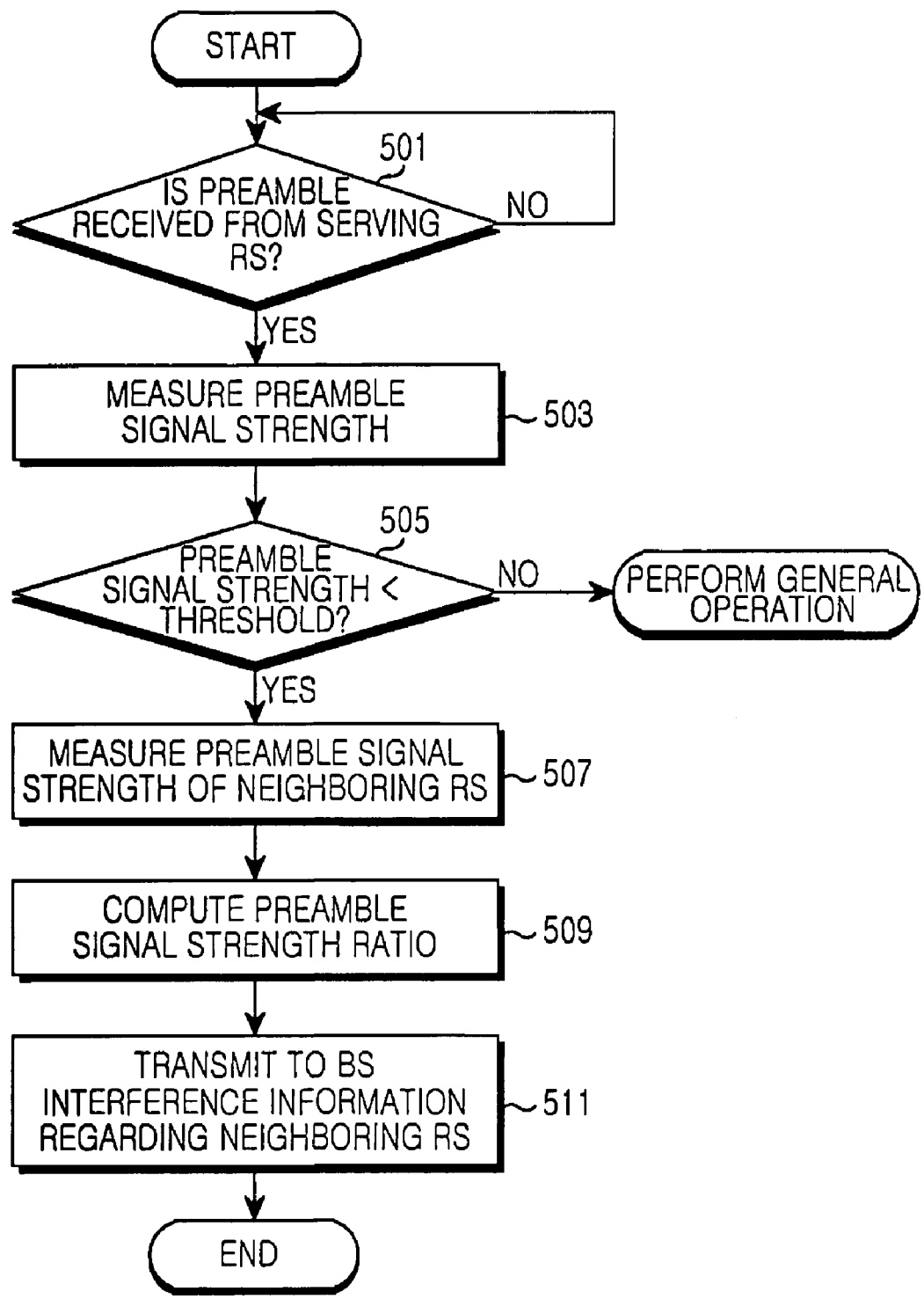
FIG. 5 is a flowchart of a procedure of frequency reuse to avoid interference between an RS and an MS in a multi-hop relay system according to the present invention.

FIG. 5 is a flowchart of a procedure of frequency reuse to avoid interference between an RS and an MS in a multi-hop relay system according to the present invention.

Referring to FIG. 5, in step 501, the MS checks whether a preamble is received from a serving RS. When the preamble is received, the MS is synchronized with the serving RS using the received preamble. Then, in step 503, the MS measures a signal strength of the preamble (SS_preamble herein).

In step 505, the MS determines whether the SS_preamble is less than a predetermined threshold (preamble_threshold herein) for the SS_preamble. The preamble_threshold may be a value received from the BS using system information or a value predetermined in the system.

If the SS_preamble received from the serving RS is not less than the preamble_threshold, the MS performs a general operation. When the MS is located in a coverage boundary of the serving RS, the SS_preamble received from the serving RS becomes less than the preamble_threshold. In this case, the MS determines that a weak signal is received from the serving RS. In step 507, the MS measures another SS_preamble when a preamble is received from one or more neighboring RSs. The process of measuring the SS_preamble of a neighboring RS may be performed as described above when the measured SS_preamble of the serving RS is less than the predetermined preamble_threshold. Alternatively, this process may be performed when a measurement instruction is received from an upper node.

Step 507 may be directly performed while skipping step 505 if required, for example, due to MS capacity or various system conditions. Therefore, the SS_preamble of the neighboring RS may be measured without having to compare the SS_preamble with the preamble_threshold.

In step 509, the MS computes a preamble signal strength ratio by using an SS_preamble when a preamble is received from the serving RS and an SS_preamble when a preamble is received from the neighboring RS. The reason why the preamble signal strength ratio is computed is to determine whether interference caused by a corresponding neighboring RS is a major source of interference that affects the performance of the MS. The determination may also be made by the BS.

The preamble signal strength ratio may be computed using Equation (1):

$$\frac{SS_{RS1 \to MS1}}{SS_{RS2 \to MS1}} \quad (1)$$
$$\frac{SS_{RS2 \to MS2}}{SS_{RS1 \to MS2}}$$

Here, $SS_{RSi \to MSj}$ denotes a SS_preamble when an MSj receives a preamble transmitted from RSi. In Equation (1), the preamble signal strength ratio is computed by driving the SS_preamble of the serving, RS by the SS_preamble of the neighboring RS. However, the preamble signal strength ratio may be computed by driving the SS_preamble of the neighboring RS by the SS_preamble of the serving RS.

In step 511, the MS transmits the computed SS_preamble to the BS as interference information regarding the serving RS. In this step, the computed preamble signal strength ratio may be transmitted without alternation to the BS as the interference information regarding the serving RS. Alternatively, the computed preamble signal strength ratio may be compared with a predetermined signal strength ratio threshold (or ratio_threshold) to determine whether a corresponding neighboring RS is associated with the major interference or the minor interference. The determination result may be transmitted to the BS by using a specific bit. The ratio_threshold may be a value received from the BS by using system information or a value predetermined in the system. The ratio_threshold may differ from one RS to another according to a transmission capability of each RS.

For example, when the computed preamble signal strength ratio is greater than the predetermined ratio_threshold, the MS transmits a report message, in which major interference occurrence is set to zero with respect to a corresponding neighboring RS, to the BS. Thus, the BS can receive a report message indicating the fact that the corresponding neighboring RS is not associated with the major interference with respect to the serving RS. On the other hand, when the computed preamble signal strength ratio is not greater than the predetermined threshold, the MS transmits a report message, in which the major interference occurrence is set to one (1) with respect to the corresponding neighboring RS, to the BS. Thus, the BS can receive a report message indicating that the corresponding neighboring RS is associated with the major interference information regarding the serving RS. The report message includes major interference occurrence information having a size of one bit.

Then, the MS transmits to the BS the major interference information regarding all neighboring RSs. The procedure of the present invention then ends.

Figure 6:
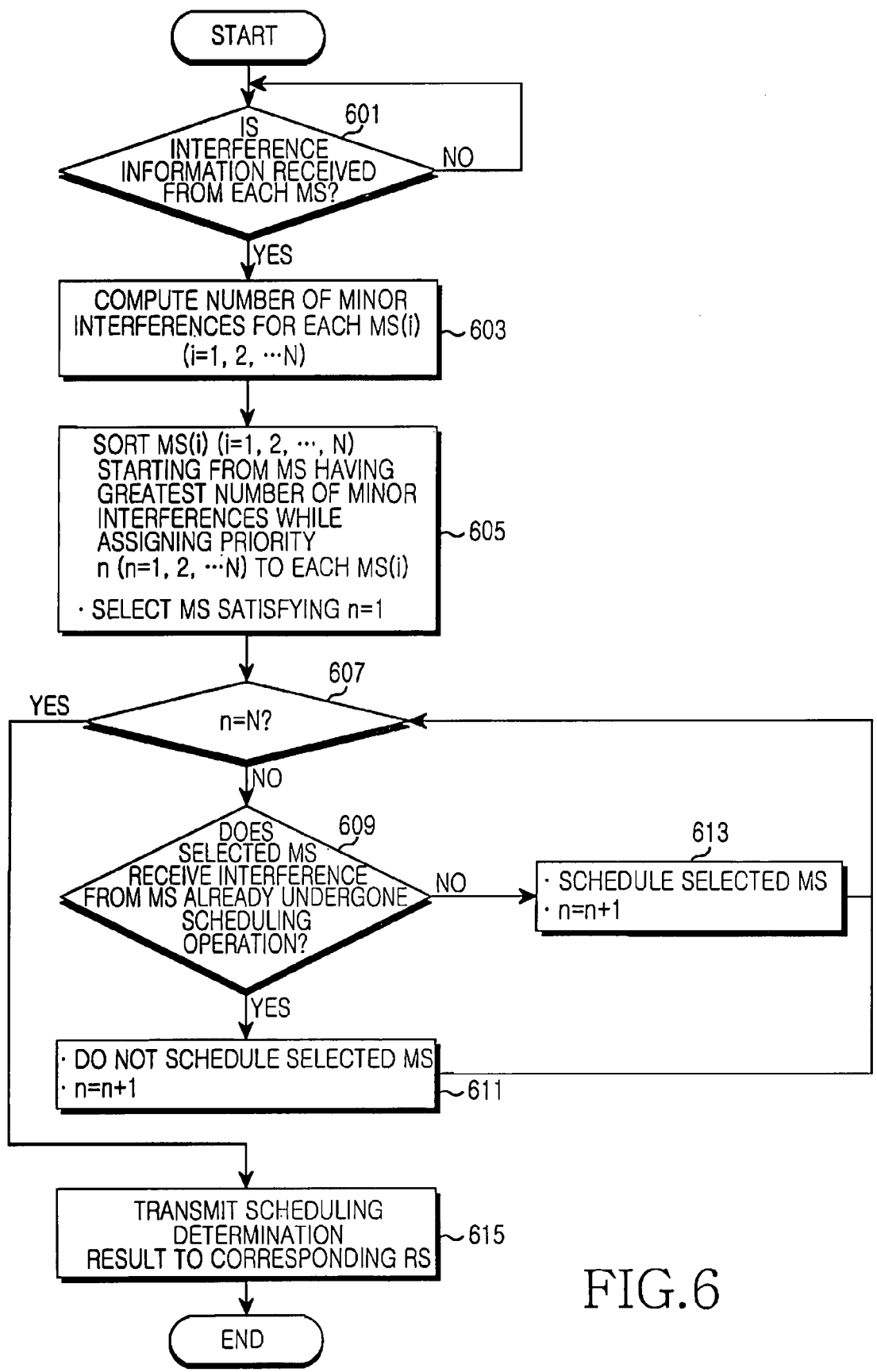
FIG. 6 is a flowchart of a procedure in which a BS schedules an MS to avoid interference between an RS and an MS in a multi-hop relay system according to the present invention.

FIG. 6 is a flowchart of a procedure in which a BS schedules an MS to avoid interference between an RS and an MS in a multi-hop relay system according to the present invention. The BS performs a scheduling operation starting from an MS suffering the major interference to the MS suffering the least frequent interference.

Referring to FIG. 6, in step 601, the BS checks whether interference information regarding a neighboring RS for a serving RS is received from a plurality of MSs. When the interference information regarding the neighboring RS for the serving RSs is received, in step 603, the BS computes the number of minor interferences for each MSs by using the interference information.

When the interference information is a preamble signal strength ratio for a neighboring RS, the preamble signal strength ratio is compared with a predetermined threshold. If the preamble signal strength ratio is less than the predetermined threshold, it is determined that the neighboring RS is in association with major interference information for its corresponding MS, and otherwise, it is determined that the neighboring RS is in association with minor interference information, so that the number of minor interferences can be computed for each MS. As the interference information, a report message may be received which includes a specific bit for indicating whether the neighboring RS is in association with the major interference information or the minor interference information. In this case, the number of minor interferences for each MS may be computed by checking the specific bit.

The number of minor interferences for each MS may be computed using Table 1. In the example provided in Table 1, the system includes three RSs and three MSs.

TABLE 1

|   | 1 | 2 | 3 |
|---|---|---|---|
| 1 | x |   |   |
| 2 |   | x |   |
| 3 |   |   | x |

Herein, the horizontal axis represents indices of the RSs that interfere with the MSs and the vertical axis represents indices of the MSs. Thus, Table 1 shows interference between a specific MS and a specific RS. A signal component received from the serving RS is indicated by an "x". Table 1 may be filled such that '1' is written when an MS is strongly interfered by its neighboring RS, and '0' is written in the case of weak interference. In this case, the number of minor interferences for each MS may be computed by counting the number of '0's filled in Table 1 for each MS.

In step 605, the BS sorts the MSs starting from an MS having the greatest number of minor interferences. Then, the BS selects one MS having the top priority, that is, n=1 where n denotes priority. If one or more MSs have the same priority, the MSs are randomly sorted.

In step 607, the BS checks whether n equals to N, where N denotes the number of the MSs. If n is not equal to N, in step 609, the BS checks whether the selected MS is interfered with an MS which has already been scheduled. If the checking result is positive, in step 611, the BS increments n by 1 instead of scheduling a corresponding MS, and then returns to step 607. Otherwise, in step 613, the BS schedules the selected MS, increments n by 1, and returns to step 607. When the BS schedules the selected MS, a corresponding RS-MS link will be is used, that is, the link will be in the power-on state all the time. On the other hand, when the BS does not schedule the corresponding MS, a corresponding RS-MS link will not be used, that is, the link will be in the power-off state all the time.

When n is equal to N, the BS determines that the scheduling operation has been finished by effectively avoiding interferences of all the MSs. Then, in step 615, the BS transmits the scheduling determination result to a corresponding RS through a BS-RS link. The procedure then ends.

Figure 7:
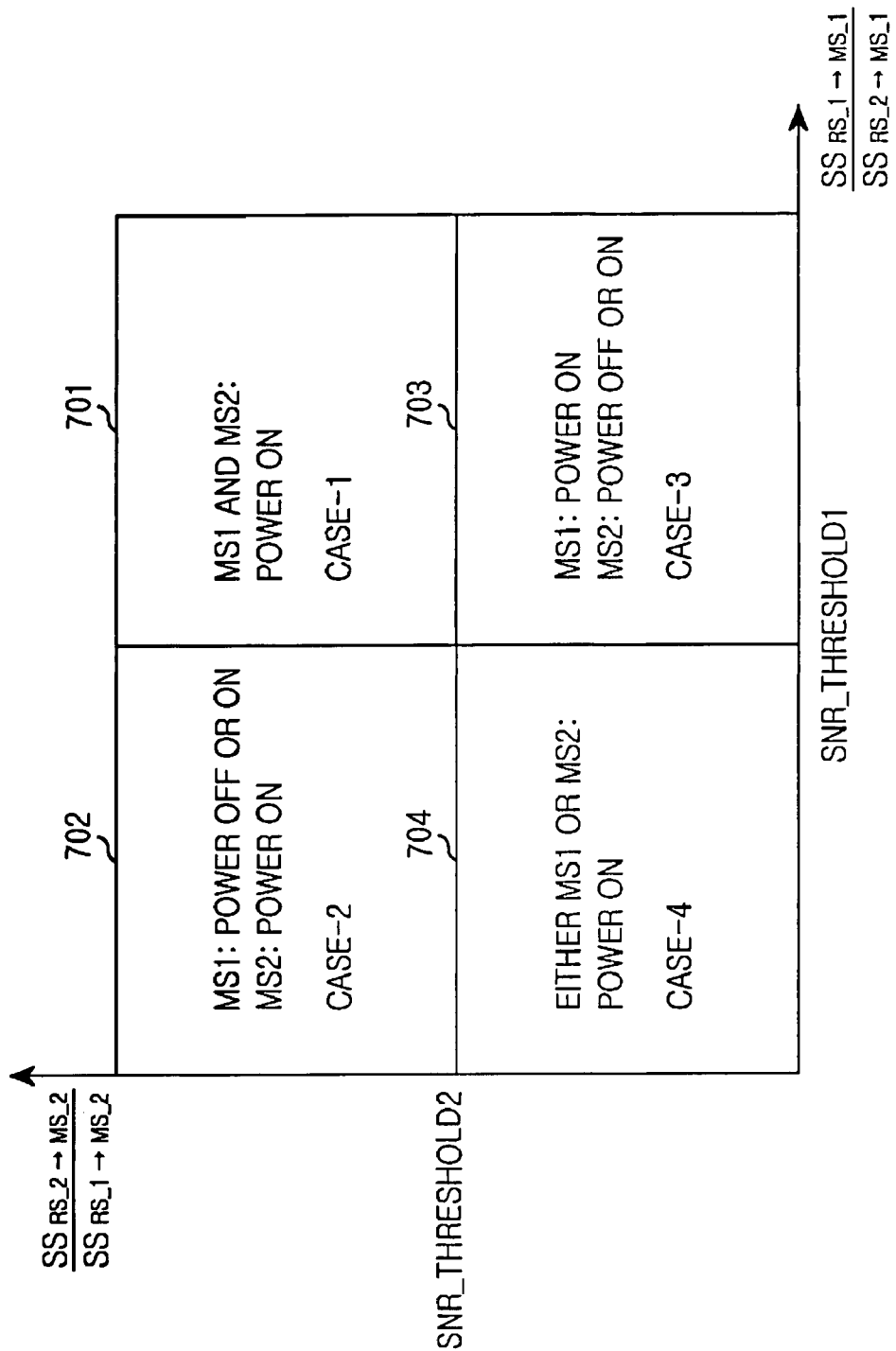
FIG. 7 are examples of a power ON/OFF scenario in an environment where two RSs respectively support two MSs.

For example, if two RSs and two MSs exist in a state that two links, i.e. RS1-MS1 and RS2-MS2, exist, the BS may schedule the two MSs in four ways, as shown in FIG. 7, by using interference information received from the two MSs.

In the first case, as indicated by 701 in FIG. 7, an MS1 does not receive major interference from an RS2 when the MS1 receives a signal transmitted from a BS1, and an MS2 does not receive major interference from an RS1 when the MS2 receives a signal transmitted from the RS2. In this case, the BS allows the RS1->MS1 link and the RS2->MS2 link to continuously be in the power-on state. In the second case, as indicated by 702 in FIG. 7, the MS1 receives major interference from the RS2 when the MS1 receives a signal transmitted from the RS1, and the MS2 does not receive the major interference from the RS1 when the MS2 receives a signal transmitted from the RS2. In this case, the BS allows the RS2->MS2 link to continuously be in the power-on state and the RS1->MS1 link to continuously be in either the power-on or power-off state.

Third, in the case indicated by 703 in FIG. 7, the MS1 does not receive major interference from the RS2 when the MS1 receives a signal transmitted from the RS1, and the MS2 receives the major interference from the RS1 when the MS2 receives a signal transmitted from the RS2. In this case, the BS allows the RS1->MS1 link to be in the power-on state and the RS2->MS2 link to continuously be in either the power-on or the power-off state. Fourth, in the case indicated by 704 in FIG. 7, the MS1 receives major interference from the RS2 when the MS1 receives a signal transmitted from the RS1, and the MS2 does not receive the major interference from the RS1 when the MS2 does not receive a signal transmitted from the RS2. In this case, the BS uses only one of the two links at a specific time point similar to the case of using a Time Division Multiple Access (TDMA) method.

In the cases 702 and 703, where only one MS receives minor interference and the remaining MSs receives major interference, the BS allows a link towards the MS receiving major interference to be in the power-on or power-off state. An overall cell capacity is not affected according to which state (i.e., power-on state or power-off state) is selected for the MS receiving the major interference. In the above description, a case is selected in which the MS receiving the major interference is in the power-off state.

Figure 8:
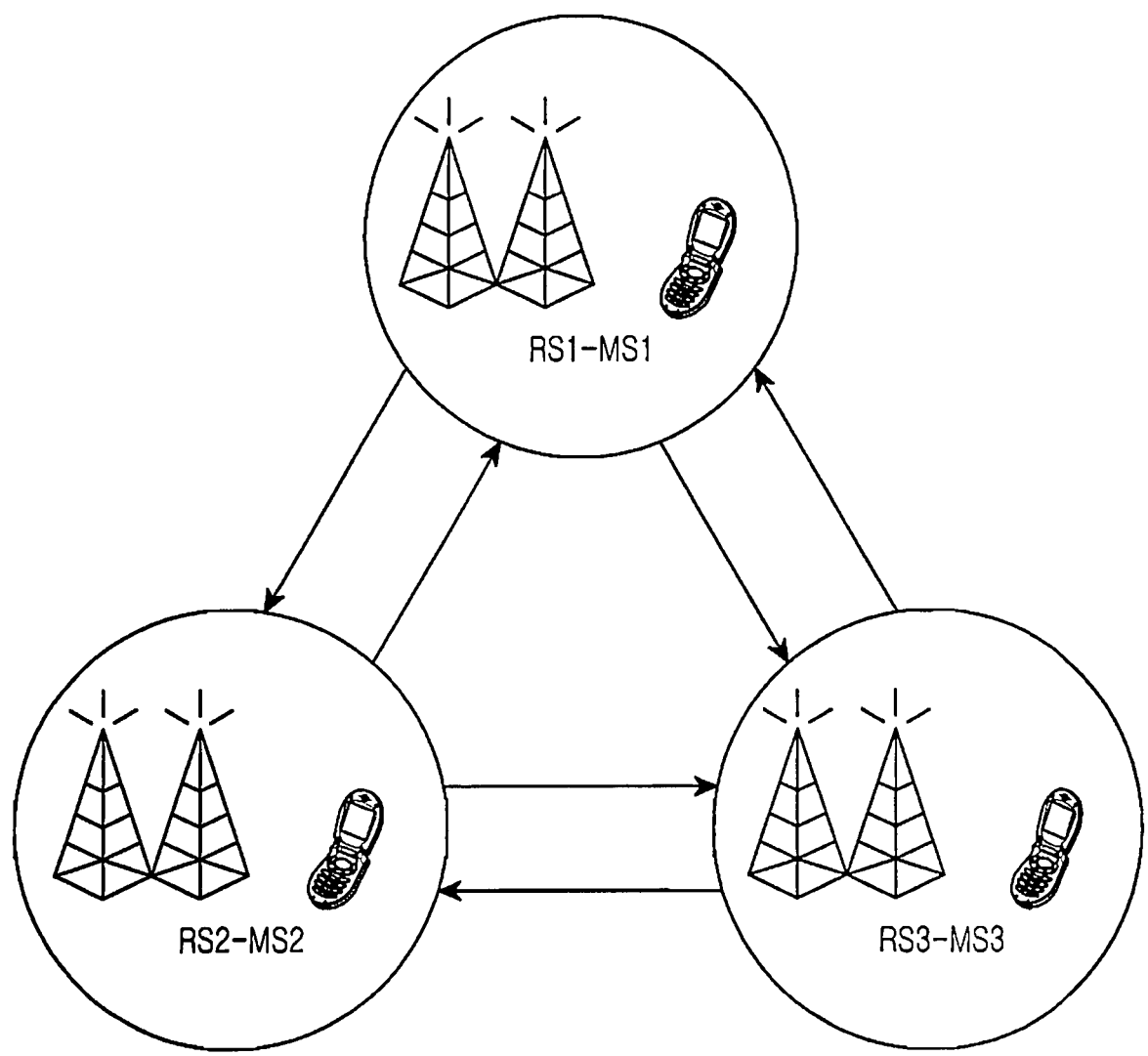
FIG. 8 illustrates major interference among three RS-MS links.

In another example, as shown in FIG. 8, three RSs and three MSs exist, and the three RSs respectively provide service to the three MSs. In this case, a BS schedules the three MSs by using interference information received from the three MSs. In the first case, when each MS receives major interference from two neighboring RSs, the BS schedules only one MS (e.g., MS1, MS2, or MS3) according to a performance measurement (e.g., cell capacity) for the BS, so that the scheduled MS can avoid the major interference. In the second case, the BS schedules two MSs (e.g., MS1 and MS2, MS1 and MS3, or MS2 and MS3) each of which does not cause major interference. In the third case, when all three MSs do not receive the major interference, the BS schedules the three MSs (e.g., MS1, MS2 and MS3).

According to the present invention, in a multi-hop relay system, an MS transmits a minimum amount of interference information to a BS, and the BS performs a scheduling operation according to the interference information received from the MS, thereby avoiding interference of an MS-RS link. Therefore, there is an advantage in that capacity between an RS and an MS can increase since frequency reuse can be achieved by avoiding interference between the RS and the MS.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of avoiding interference between a Relay Station (RS) and a Mobile Station (MS) in a communication system, the method comprising:

measuring a preamble signal strength of a serving RS;

measuring a preamble signal strength of a neighboring RS; and computing a preamble signal strength ratio using the preamble signal strength of the serving RS and the preamble signal strength of the neighboring RS.

2. The method of claim 1, further comprising transmitting the computed preamble signal strength ratio to an upper node.

3. The method of claim 1, wherein the preamble signal strength ratio is computed by dividing the preamble signal strength of the serving RS by the preamble signal strength of the neighboring RS or by dividing the preamble signal strength of the neighboring RS by the preamble signal strength of the serving RS.

4. The method of claim 1, further comprising:
if the preamble signal strength ratio is less than a predetermined threshold, allowing an interference information report message to indicate that the neighboring RS is in association with major interference,
if either preamble signal strength is not less than the predetermined threshold, allowing the interference information report message to indicate that the neighboring RS is in association with minor interference, and
transmitting the interference information report message to an upper node.

5. The method of claim 1, wherein the measuring a preamble signal strength of a neighboring RS is performed when the measured preamble signal strength of the serving RS is less than a predetermined threshold or when an measurement instruction is received from the upper node.

6. A method of avoiding interference between a Relay Station (RS) and a Mobile Station (MS) in a communication system, the method comprising:
if interference information is received from one or more MSs, selecting one MS having a greatest number of minor interferences by using received interference information for each MS; and
scheduling the selected MS.

7. The method of claim 6, further comprising:
selecting one MS having a second greatest number of minor interferences by using the interference information for each MS from among remaining MSs other than a previously selected MS; and
scheduling the selected MS.

8. The method of claim 6, further comprising transmitting a scheduling determination result to the RS.

9. The method of claim 6, wherein the scheduling the selected MS further comprises:
when the selected MS does not receive interference from an MS which has already been scheduled, scheduling the selected MS; and
when the selected MS receives interference from the MS which has already been scheduled, not scheduling the selected MS.

10. The method of claim 6, wherein the interference information shows whether interference between the selected MS and a neighboring RS is major interference or minor interference.

11. The method of claim 6, wherein the interference information is a preamble signal strength ratio computed by using a preamble signal strength of a serving RS and a preamble signal strength of a neighboring RS.

12. The method of claim 11, further comprising determining whether interference between the selected MS and the neighboring RS is major or minor interference by using the preamble signal strength ratio and a predetermined threshold.

13. An apparatus for avoiding interference between a Relay Station (RS) and a Mobile Station (MS) in a communication system, the apparatus comprising:
a preamble signal strength measuring unit for measuring a preamble signal strength of a serving RS and a preamble signal strength of a neighboring RS; and
a preamble signal strength ratio computation unit for computing a preamble signal strength ratio using the preamble signal strength of the serving RS and the preamble signal strength of the neighboring RS.

14. The apparatus of claim 13, further comprising a transmitter for transmitting the computed preamble signal strength ratio to an upper node.

15. An apparatus for avoiding interference between a Relay Station (RS) and a Mobile Station (MS) in a communication system, the apparatus comprising:
an interference information receiver for receiving interference information from one or more MSs; and
a scheduler for selecting one MS having a greatest number of minor interferences by using the received interference information for each MS and then scheduling the one selected MS.

16. The apparatus of claim 15, wherein the scheduler selects a second MS having a second greatest number of minor interferences by using the interference information for each MS from among remaining MSs other than the previously selected MS, and schedules the selected MS.

17. The apparatus of claim 15, further comprising a transmitter for transmitting a scheduling determination result to the RS.

18. The apparatus of claim 15,
wherein if the selected MS does not receive interference from an MS which has already been scheduled, the scheduler schedules the selected MS, and
if the selected MS receives interference from an MS which has already been scheduled, the scheduler does not schedule the selected MS.

19. The apparatus of claim 16,
wherein if the selected MS does not receive interference from an MS which has already been scheduled, the scheduler schedules the selected MS, and
if the selected MS receives interference from an MS which has already been scheduled, the scheduler does not schedule the selected MS.

20. An apparatus for avoiding interference between a Relay Station (RS) and a Mobile Station (MS) in a communication system, the apparatus comprising:
means for selecting a MS having a greatest number of minor interferences by using received interference information for one or more MSs; and
means for scheduling the selected MS.

* * * * *